US 8,024,417 B2

(12) United States Patent
Mehrotra

(10) Patent No.: US 8,024,417 B2
(45) Date of Patent: Sep. 20, 2011

(54) SIMPLE FLOW CONTROL PROTOCOL OVER RDMA

(75) Inventor: Pronita Mehrotra, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 704 days.

(21) Appl. No.: 12/133,093

(22) Filed: Jun. 4, 2008

(65) Prior Publication Data
US 2009/0319701 A1 Dec. 24, 2009

(51) Int. Cl.
G06F 15/167 (2006.01)
G06F 15/16 (2006.01)
G06F 13/00 (2006.01)

(52) U.S. Cl. ......... 709/213; 709/212; 709/217; 711/170

(58) Field of Classification Search .......... 709/212, 709/217, 227, 237; 710/22, 51, 56, 57; 711/170, 711/173
See application file for complete search history.

(56) References Cited

U.S. PATENT DOCUMENTS

| 5,473,604 | A | * | 12/1995 | Lorenz et al. ............ 370/229 |
| 5,898,671 | A | | 4/1999 | Hunt et al. |
| 6,151,300 | A | | 11/2000 | Hunt et al. |
| 6,594,701 | B1 | | 7/2003 | Forin |
| 6,745,361 | B1 | | 6/2004 | Gradischnig |
| 6,754,228 | B1 | | 6/2004 | Ludwig |
| 6,981,051 | B2 | * | 12/2005 | Eydelman et al. ........... 709/232 |
| 7,072,299 | B2 | | 7/2006 | Bass et al. |
| 7,215,641 | B1 | | 5/2007 | Bechtolsheim et al. |
| 2005/0235059 | A1 | * | 10/2005 | Eydelman et al. ............ 709/224 |
| 2006/0004904 | A1 | * | 1/2006 | Sarangam et al. ............ 709/200 |
| 2006/0179182 | A1 | | 8/2006 | Chadha et al. |
| 2007/0115824 | A1 | | 5/2007 | Chandra et al. |

OTHER PUBLICATIONS

Hayden, et al., "A Multicast Flow Control Protocol", at <<http://ecommons.library.cornell.edu/bitstream/1813/7393/2/99-1739.ps.>>, Apr. 6, 1999, pp. 8.
Minkenberg, et al., "Speculative Flow Control for High-Radix Datacenter Interconnect Routers", at <<http://www.cecs.uci.edu/~papers/ipdps07/pdfs/IPDPS-1569010759-paper-1.pdf>>, IEEE, 2007, pp. 10.
"Reliable Multicasting with the JGroups Toolkit", at <<http://www.jgroups.org/javagroupsnew/docs/manual/pdf/manual.pdf>>, Red Hat Inc. 2006-2008, pp. 86.
Shipman, et al., "Investigations on InfiniBand: Efficient Network Buffer Utilization at Scale", available at least as early as Oct. 22, 2007; at <<http://www.open-mpi.org/papers/euro-pvmmpi-2007-ib/euro-pvmmpi-2007-ib.pdf>>, pp. 8.

* cited by examiner

Primary Examiner — Brian J Gillis
(74) Attorney, Agent, or Firm — Lee & Hayes, PLLC

(57) ABSTRACT

A method and system for directing data transfers between applications residing on different computers or devices using a simplified flow control protocol. The protocol eliminates the need for and use of flow control modes and supports all possible data transfer mechanisms. The protocol also allows source and sink applications to independently set their own local memory threshold over which data transfers are made using remote direct memory access (RDMA) or zero-copy transfers. Through adjusting its threshold value or size, a sink or receiving application or component adapts its behavior to the behavior of a sending or source application or component.

15 Claims, 6 Drawing Sheets

BACKGROUND

BACKGROUND

BACKGROUND

BACKGROUND

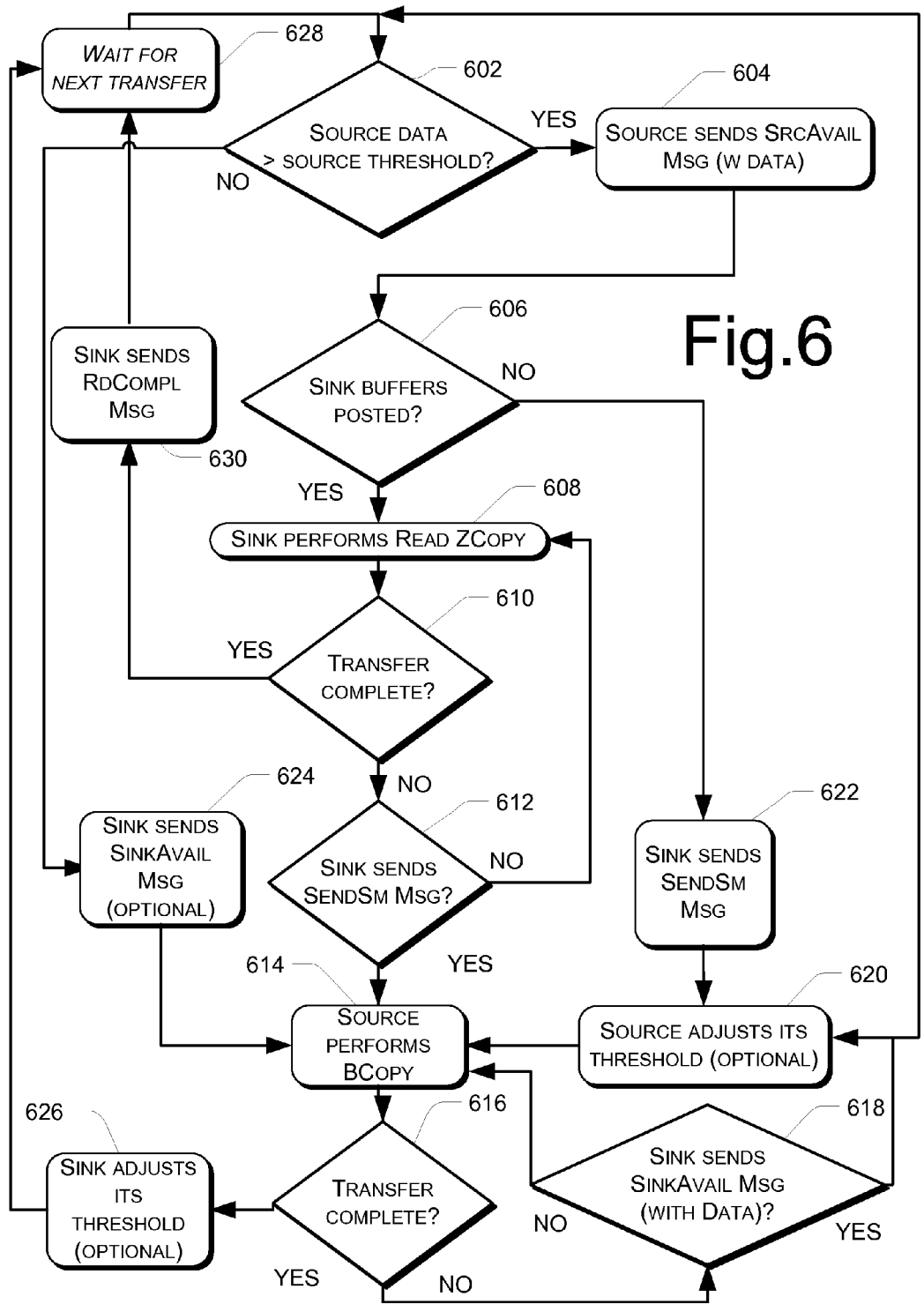

SIMPLE FLOW CONTROL PROTOCOL OVER RDMA

BACKGROUND

Software applications residing on separate computers or devices communicate with each other over networks. Traditional network protocols, such as Ethernet and Asynchronous Transfer Mode (ATM), are not reliable for application-to-application communication and provide only machine-to-machine datagram delivery service. Transport protocol software operating on host machines can provide more direct and reliable application-to-application communication.

Typically, protocol software for network communication is implemented as a combination of a kernel-mode driver and a user-mode library. All application communication passes through these components. As a result, application communication consumes a significant amount of the resources of its host processor and incurs unnecessary latency. Both of these effects degrade application communication performance. This degradation significantly limits the overall performance of communication intensive applications, such as distributed databases.

Recently, a new class of connectivity called System Area Networks (SANs) has emerged to address the performance requirements of communication intensive distributed applications. SANs provide very high bandwidth communication with relatively low latency. SANs differ from existing technologies, such as Gigabit Ethernet and ATM, because they implement reliable transport functionality directly in hardware. Each SAN network interface controller (NIC) exposes individual transport endpoint contexts and demultiplexes incoming packets accordingly. Each endpoint is usually represented by a set of memory-based queues and registers that are shared by the host processor and the NIC. Many SAN NICs permit these endpoint resources to be mapped directly into the address space of a user-mode process which allows application processes to post messaging requests directly to the hardware. This design consumes very little of the resources of a host processor and adds little latency to the communication. As a result, SANs can deliver relatively fast communication performance to applications.

In general, SAN hardware does not perform any end-to-end flow control. Most distributed applications are designed to communicate using a specific transport protocol and a specific application programming interface (API). A large number of existing distributed applications are designed to use the Transmission Control Protocol/Internet Protocol (TCP/IP) suite and some variant of the Berkeley Sockets API, such as Windows Sockets.

Some existing applications are designed to use a primary transport protocol and API such as a TCP/IP or Sockets-based API. In order to enable data transfer between machines in a SAN without using an existing or TCP/IP protocol on each machine, a new protocol must be implemented that controls the transfer of data from source memory buffers supplied by a first software application into destination memory buffers supplied by a second software application. This aspect of data transfer is known as flow control.

In SANs, Sockets Direct Protocol (SDP) and Windows Sockets Direct (WSD) protocol allow network applications, written using a sockets API, a direct path to system hardware. SDP provides several data transfer mechanisms. Broadly, there are two ways to transfer data in a SAN: as small messages or via remote direct memory access (RDMA) transfers.

Small messages are transferred from a private and pre-registered set of buffers of a source or send application to a private and pre-registered set of buffers of a sink or receive application. This mechanism is referred to as a buffer copy or BCopy. Each application operating on peer computers selects its own size and number of buffers. The source application is responsible to ensure that the message fits into the buffers of the receiving application.

For large data transfers or RDMA transfers, the (memory) buffers are dynamically registered prior to copying data. RDMA transfers are zero-copy transfers and bypass the kernel. Kernel bypass allows applications to issue commands to a NIC without having to execute a kernel call. RDMA requests are issued from local user space to the local NIC and over the network to the remote NIC without requiring any kernel involvement. This reduces the number of context switches between kernel space and user space while handling network traffic.

One type of RDMA transfer is a read zero-copy or Read ZCopy transfer. A Read ZCopy transfer is illustrated in FIG. 1. With reference to FIG. 1, a transfer application (not shown) operating on a data source device 102 sends a source available message 112 to a transfer application (not shown) operating on a data sink device 104. Next, the transfer application of the data sink device 104 performs a Read ZCopy transfer or RDMA read 114 by copying data directly from memory buffers of a user application operating on the data source device 102 to one or more memory buffers of another user application operating on the data sink device 104. Finally, the transfer application of the data sink device 104 sends an acknowledgement or RDMA Read Complete message 116 to the transfer application of the data source device 102.

Another type of RDMA transfer is a write zero-copy or Write ZCopy transfer. A Write ZCopy transfer is illustrated in FIG. 2. With reference to FIG. 2, A transfer application (not shown) of a data source device 102 sends a source available message 112 to a transfer application (not shown) of a data sink device 104; this message is optional. The data sink application sends a sink available message 212 to the application of the data source device 102 indicating that one or more memory buffers are ready to receive data. The data source transfer application responds by performing a Write ZCopy transfer or RDMA write 214 directly from user buffers of the data source device 102 to user buffers of the data sink device 104. The data source transfer application then sends a write complete message 216 to the application of the data sink device 104 indicating that the transfer is complete.

A third type of RDMA transfer is called a transaction mechanism and is similar to a Write ZCopy transfer; this mechanism is illustrated in FIG. 3. This type of transfer is optimum for transaction-oriented data traffic where one transfer application sends relatively small commands and expects medium to large responses. With reference to FIG. 3, a sink available message 312 is sent from a transfer application on the data sink device 104 to a transfer application on the data source device 102. However, in this transfer, extra information or "data" is appended to the message 312 indicating where to transfer data, via Write ZCopy, from a data source device 102 to a data sink device 104. Once the message is received, the transfer application or program operating on the data source device 102 performs an RDMA Write or Write ZCopy transfer 214 and sends a write complete message 216 to the transfer application of the data sink device 104 indicating that the transfer is complete.

Existing transfer applications using SDP and WSD manage both small and large data transfers through flow control modes. For example, SDP provides at least three modes: Pipelined Mode, Combined Mode, and Buffered Mode. Each transfer application is ordinarily in a single mode at any given time. However, mode is typically in reference to the transfer application which is receiving data. Mode change messages may cause the receiving application to change to a different mode.

Buffered Mode corresponds to always transferring data in small messages through BCopy.

Combined Mode corresponds to the receiving application waiting to receive an indication that data is available before it posts large receive buffers for RDMA transfers. Transfers in Combined Mode occur through BCopy, if the data size is smaller than an RDMA threshold, or through Read ZCopy. Since the sink user application expects a source available message before posting large RDMA buffers, the message typically contains a beginning portion of the send data.

Pipelined Mode corresponds to an application which always posts large receive buffers. In this mode, all types of transfers (e.g. BCopy, Read ZCopy, Write ZCopy) may be made. Since the application in this mode always pre-posts receive buffers, and is not waiting for any data receive information, the source available message does not carry data.

FIG. 4 shows the transition between the various SDP flow control modes. Each mode has a master transfer application and a slave transfer application; the master initiates a mode change by sending a mode change message and then immediately changes to a new mode. The master and slave applications must be careful not to use messages that are not allowed in a particular mode implying that a master application must finish sending data in modes not allowed in a new mode before sending a change mode message.

With reference to FIG. 4, once a connection is initialized between transfer applications operating on separate computers or devices, each transfer application is set to the Combined Mode 404. In this mode, if a transfer application (having source data) determines to change to either a Pipelined Mode 402 or a Buffered Mode 406, the source application initiates the change since it is the master application. The same is true if the source transfer application is in the Pipelined Mode 402. However, the sink transfer application is the master when the transfer applications are in the Buffered Mode 406.

Switching between modes and managing mode changing messages makes SDP and WSD excessively complex, especially since these protocols are designed for low-latency, high-throughput environments.

SUMMARY

Described herein is an exemplary computer program and system for implementing a simple flow control protocol to exchange data. Network interface controllers (NICs) which are enabled to transfer data in system area networks (SANs), or SAN-enabled NICs, and other hardware components provide means whereby remote direct memory access (RDMA) transfers move or exchange data between computers or devices.

Applications, which implement the simple flow control protocol, transfer data between two computers or devices based on the size of the data relative to a local threshold or a remote threshold. Data is transferred by one of two mechanisms: a buffer copy or RDMA transfer. The protocol eliminates traditional mode switching such as that used in the Sockets Direct Protocol. The protocol functions even if no read zero-copy function or mechanism is supported by using a write zero-copy function. The source transfer application and the receiving or sink transfer application can independently respond to the behavior of the other by adjusting their respective threshold values or threshold sizes. The protocol is designed to maximize the communication bandwidth and minimize the communication latency observed by the communicating user applications.

This Summary is provided to introduce a selection of concepts in a simplified form that are further described below in the Detailed Description. This Summary is not intended to identify essential features of the claimed subject matter, nor is it intended to be used to limit the scope of the claimed subject matter.

BRIEF DESCRIPTION OF THE DRAWINGS

The Detailed Description is set forth and the teachings are described with reference to the accompanying figures.

FIG. 6 is a flowchart of an exemplary implementation of the simple flow control protocol.

DETAILED DESCRIPTION

What has been needed is a flow control protocol that removes the redundant features of Sockets Direct Protocol (SDP) and Windows Sockets Direct (WSD) protocol, removes any mode switching, and allows user and transfer applications to take fuller advantage of the performance benefits of System Area Networks (SANs) and remote direct memory access (RDMA).

Figure 1:
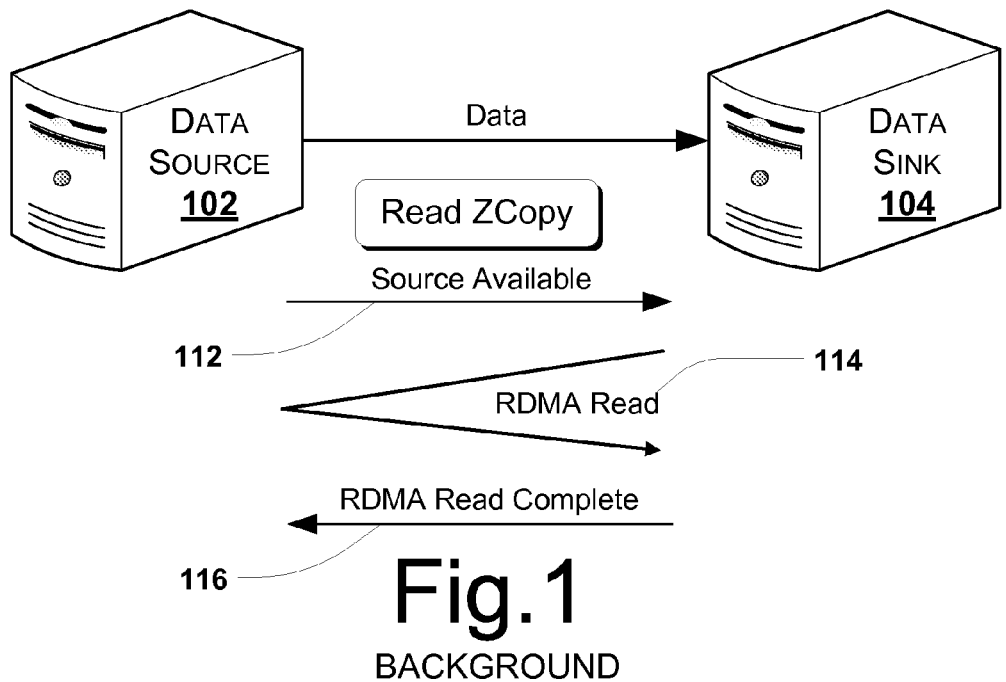
FIG. 1 is a diagram of RDMA flow control messages for read zero-copy transfers according to the Sockets Direct Protocol (SDP).
Figure 2:
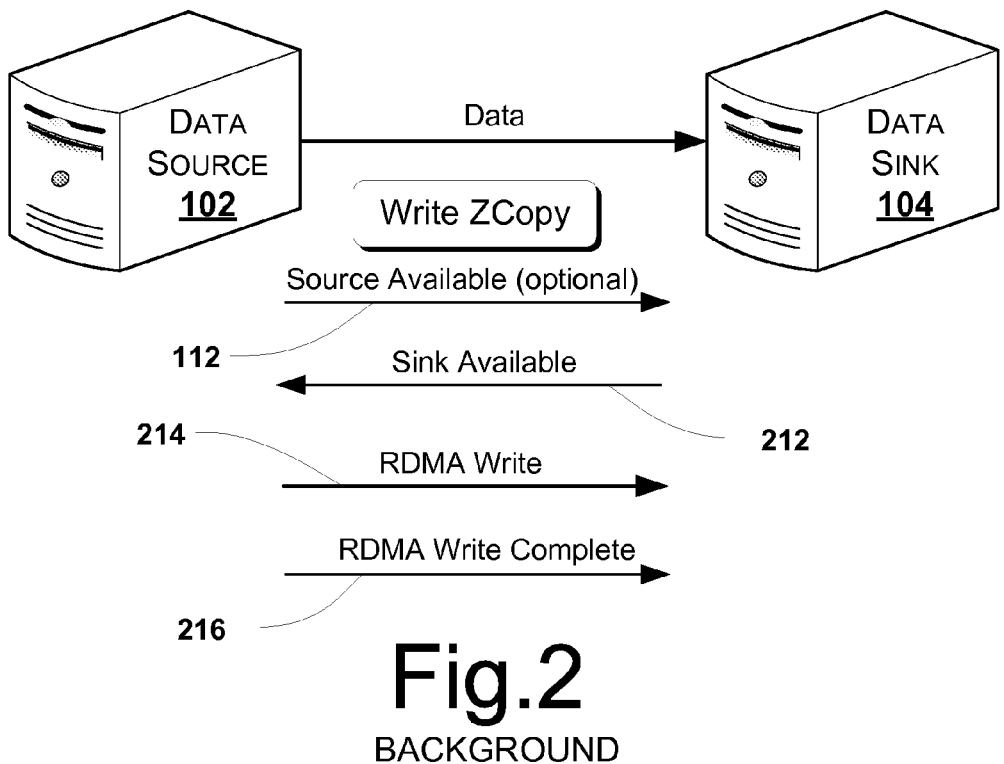
FIG. 2 is a diagram of RDMA flow control messages for write zero-copy transfers according to SDP.
Figure 3:
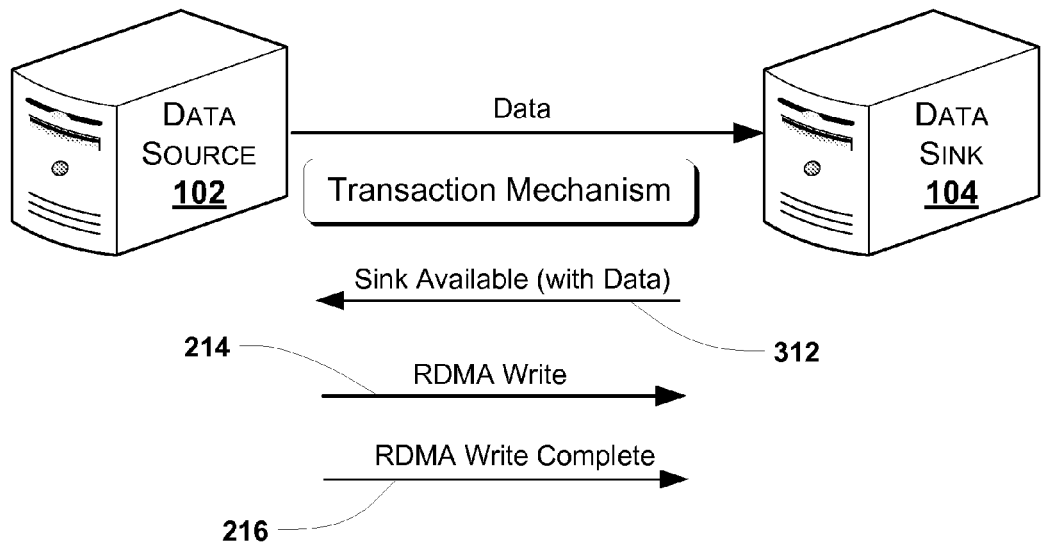
FIG. 3 is a diagram of RDMA flow control messages for transaction mechanism transfers according to SDP.
Figure 4:
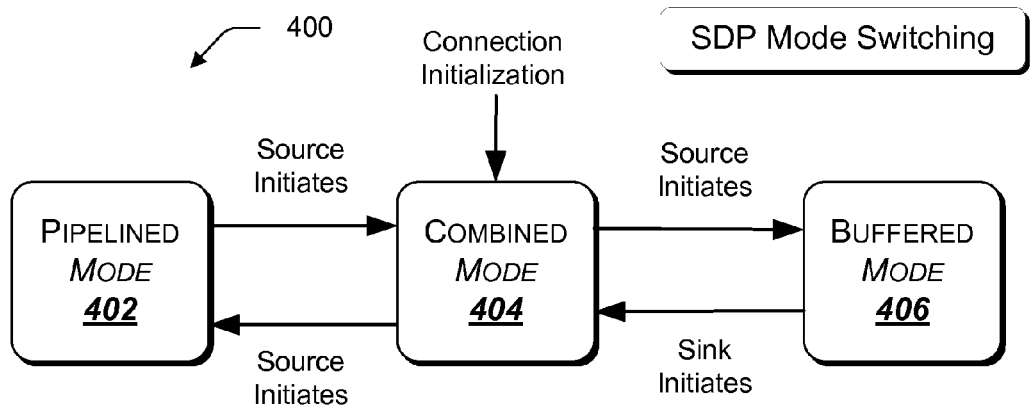
FIG. 4 is a diagram that shows switching between transfer modes according to SDP.

The simple flow control protocol described herein preferably operates in distributed computing environments where tasks are performed by local and remote processing devices that are linked through a communications network. In a distributed computing environment, program modules may be located in both local and remote memory storage devices. The simple flow control protocol operates without explicit mode switching 400 as done in the Sockets Direct Protocol and as shown in FIG. 4. The simple flow control protocol may adjust its data transfer strategy based on the behavior of the communicating applications.

Figure 5A:
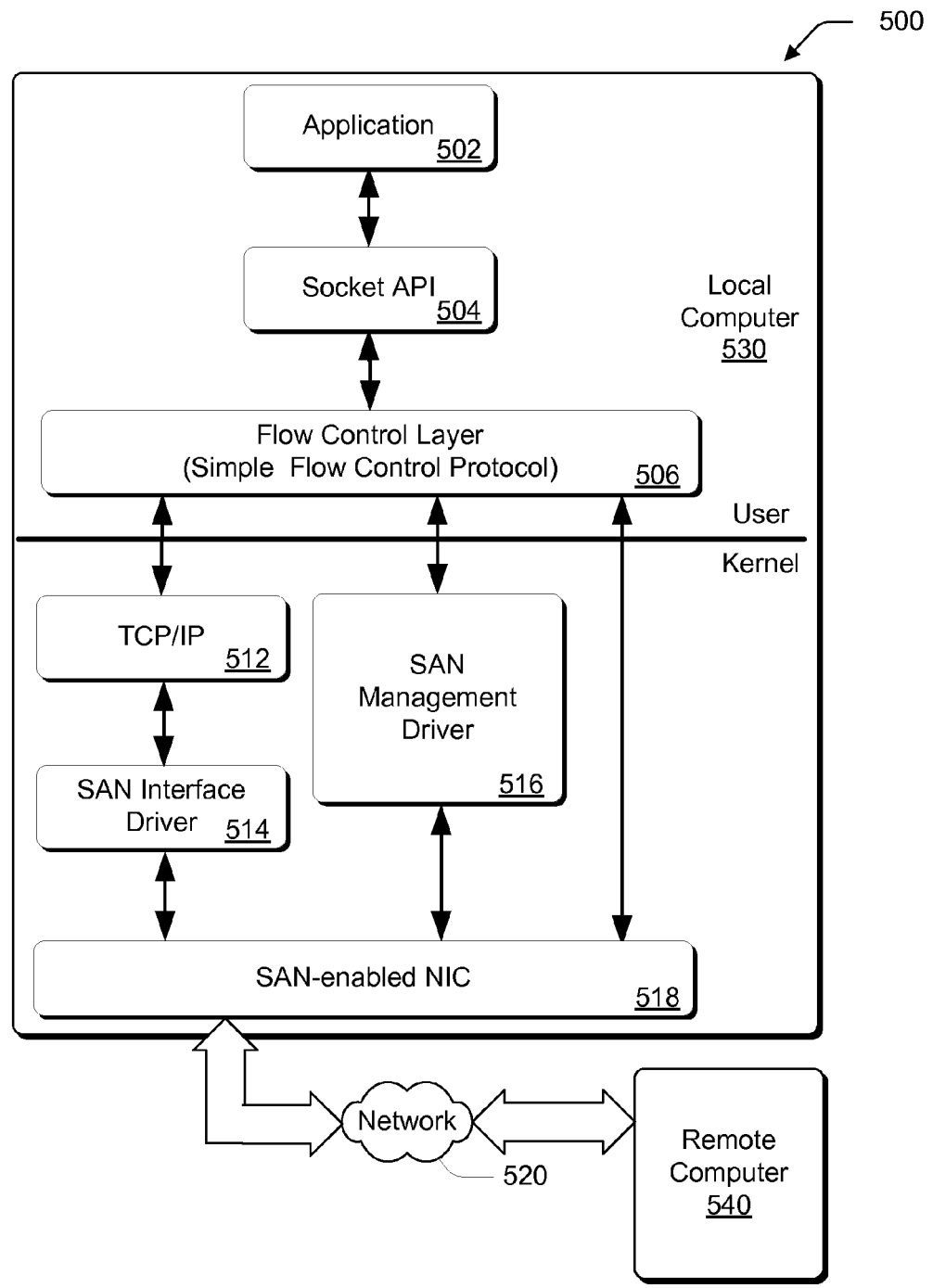
FIG. 5A is a diagram of a representative environment in which traditional and simple flow control protocols operate.

FIG. 5A shows a representative environment 500 in which transfer applications implement the simple flow control protocol. With reference to FIG. 5A, the environment 500 comprises a local computer 530 and a remote computer 540. A local user application 502 operating on the local computer 530 is in communication with a SAN-enabled NIC 518 through various components. The local user application 502 is in communication with a socket API 504 which, in turn, is in communication with a flow control layer 506 which implements the simple flow control protocol. The flow control layer 506 operates as a traditional socket provider, such as a Microsoft® Winsock provider, and a SAN socket provider. These components typically operate in user mode as opposed to kernel mode, although the protocol may be implemented at any security level.

In one embodiment, a SAN-enabled NIC is a network interface card which allows a computer or device using the card to transfer data by remote direct memory access transfers across the system or storage area network to which the computer or device belongs. A SAN-enabled NIC may have other or additional features.

With reference to FIG. 5A, the flow control layer 506 communicates with traditional TCP/IP components 512 in the kernel. The TCP/IP components in turn communicate with a SAN interface driver 514, which then communicates with a SAN-enabled NIC 518. On the other hand, the flow control layer 506 may alternatively communicate with a SAN management driver 516 or directly with the SAN-enabled NIC 518. It is the direct communication between the flow control layer 506 and the SAN-enabled NIC 518 that provides improvements over existing protocols. The SAN-enabled NIC 518 is in communication with the network 520 and a remote computer 540. Although not shown in FIG. 5A, the same or a similar environment exists on the remote computer 540. Although one environment is shown and described, other environments may be used in which to implement the simple flow control protocol.

In other embodiments, there may be an additional component (not shown) between the SAN interface driver 514 and the SAN-enabled NIC 518, and between the SAN management driver 516 and the SAN-enabled NIC 518. Such a component may be a miniport driver which connects hardware devices to a protocol stack. A miniport driver handles the hardware-specific operations necessary to manage a network adapter or other hardware device. A miniport driver is helpful to hardware manufacturers because the miniport driver may be updated to provide added functionality.

Figure 5B:
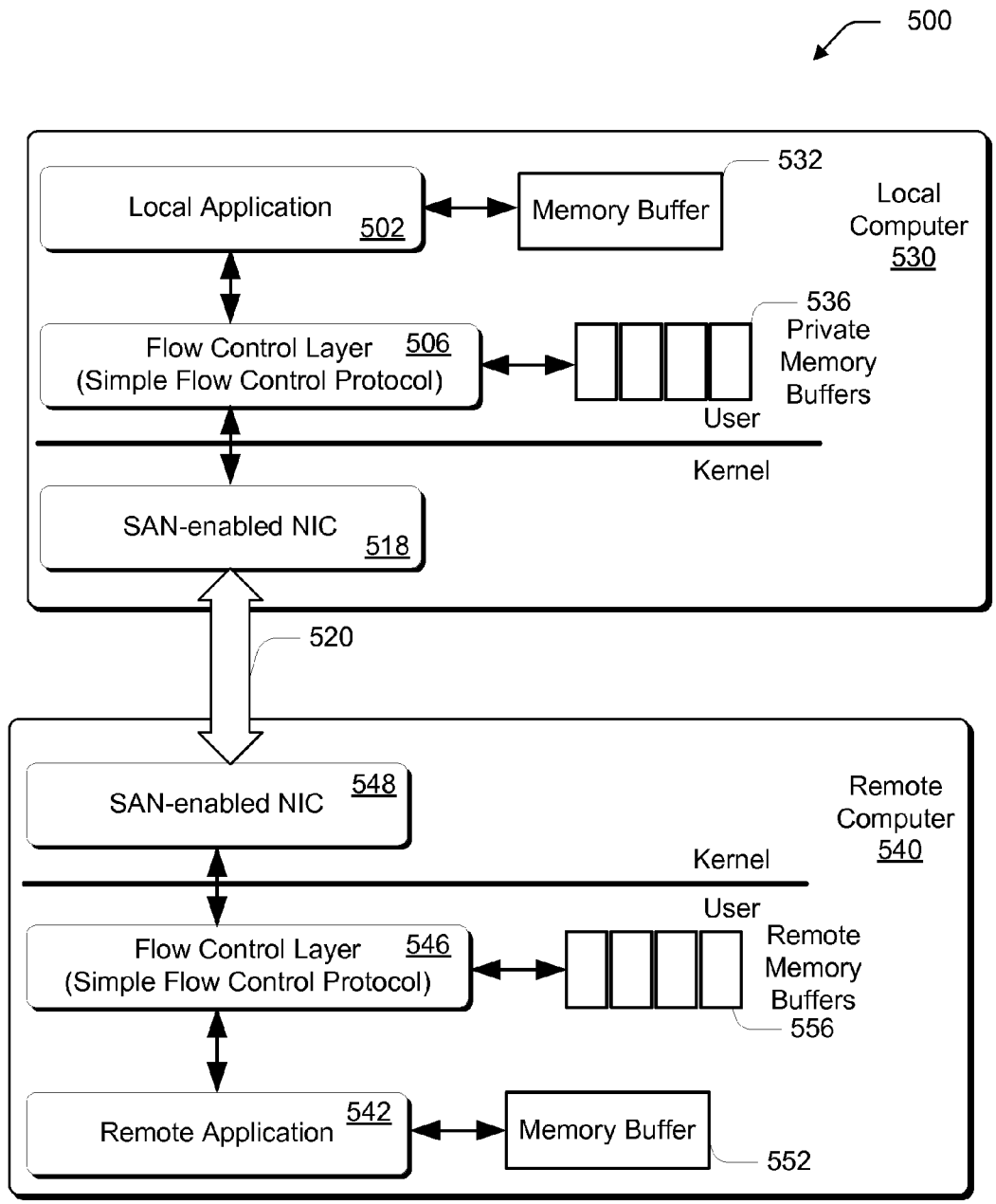
FIG. 5B is a diagram of a representative environment in which the simple flow control protocol operates.

FIG. 5B shows isolated elements of the representative environment 500 in which the simple flow control protocol is used. With reference to FIG. 5B, the local computer 530 is comprised of a SAN-enabled NIC 518, a local flow control layer or transport application 506, and a local user application 502. The local user application 502 may, from time to time, post one or more memory buffers 532 either for sending or receiving data. The local flow control layer 506 posts private memory buffers 536 with which it can perform BCopy transfers with the remote memory buffers 556 of the remote flow control layer 546.

The user applications 502, 542 and flow control layers 506, 546 are shown operating in a user security level, but may be implemented in any security mode or combination of modes such as in a combination of user and kernel modes, or just in kernel mode. The remote computer 540 is comprised of a SAN-enabled NIC 548, a remote flow control layer 546, and a remote user application 542.

When requested to do so, the flow control layers 506, 546 perform zero-copy or RDMA transfers. For example, during an RDMA or Read ZCopy transfer from the local user application 502 to the remote user application 542, the local flow control layer 506 sends a source-ready message to the remote flow control layer 546. The remote flow control layer 546 then performs a Read ZCopy by copying the portion of the local memory buffer 532 specified in the source-ready message to the remote memory buffer 552 posted by the remote application 542.

The remote flow control layer 546 then sends a copy complete message to the local flow control layer 506 which then communicates with the local user application 502 indicating to the local user application 502 that the transfer was successful. A Write ZCopy works in a similar fashion with the local flow control layer 506 performing the RDMA transfer from the local memory buffer 532 to the remote memory buffer 552. While a "layer" has been described as performing the protocol, the protocol may be performed by any software program or application, hardware device or application, or other entity, or any combination of entities.

FIG. 6 is a flowchart of an exemplary implementation of the simple flow control protocol. With reference to FIG. 6, when a sending or source application (e.g. local user application 502) is prepared to transfer source data across a SAN or other network to a receiving or sink application (e.g. remote application 542), the source application determines if the size of the source data is larger than a source threshold 602. The value of the source threshold may be maintained by a flow control layer or by an application. The source threshold may be used on an application-by-application basis, or globally for a flow control layer which then services any number of applications operating on a particular computer or device. Alternatively, the flow control layer may determine if size of the source data is larger than a source threshold 602.

If the source data is smaller than the source threshold 602, the flow control layers perform a BCopy transfer 614 of the source data to the sink application. This situation is referred to as making small transfers. In a preferred embodiment, the flow control layers always have posted a set of memory buffers for sending and receiving BCopy transfers.

In this scenario, the source application does not initially receive any indication whether the sink application has posted sink buffers for RDMA transfers. In the event that the flow control layers perform BCopy transfers (source data being smaller than the source threshold), the remote or sink flow control layer may send a sink available message (SinkAvail Msg) 624 to the local or source flow control layer if the remote application has posted sink memory buffers. The remote or sink flow control layer or application may optionally adjust a sink threshold 626 based on the size of the transferred data, because the source data was not greater than the source threshold, or based on a combination of factors. In the case of the source data being smaller than the source threshold, the adjustment is typically to a higher value so that the remote or sink application does not needlessly post sink buffers and so that the remote or sink flow control layer sends out fewer sink available messages. In this way, the sink application adjusts to the behavior of the source application, an improvement over other protocols. The adjustment of the sink threshold may be controlled by an algorithm, heuristics, or other method.

With reference to FIG. 6, if the sink application posts new or additional sink buffers when a BCopy transfer is not complete 616 between the flow control layers, the sink flow control layer may send a sink available message (SinkAvail Msg) 618 to the source. In this case, the source application or source flow control layer may adjust the source threshold; typically, this adjustment is to a lower value so that an increased number of future source data transfers may be by RDMA transfer. It may then continue data transfer using BCopy or switch to an RDMA mode. If the BCopy transfer is complete 616, the flow control layers wait until the next transfer 628. Alternatively, the source application or source flow control layer may check to see if the source data is greater than the source threshold 602 and follow subsequent steps as described.

In another scenario, if the size of source data is greater than the source threshold 602, the source flow control layer sends a source available message (SrcAvail Msg) 604 to the sink. In a preferred embodiment, the source available message comprises a portion of data to be transferred and the overall size of the source data. At this point, if the sink application has posted memory buffers of sufficient size, the sink flow control layer performs a Read ZCopy transfer 608, the data being transferred directly from the source buffers to the sink buffers.

Alternatively, if the sink buffers are insufficient for the source data, the sink flow control layer may notify the sink application and the sink application may post new or additional sink buffers 606 to receive the source data. If the sink application has not or does not post sink buffers of sufficient size, the sink application sends a send small message (SendSm Msg) 622 to the source flow control layer requesting that the source flow control layer perform a BCopy transfer 614. The source, upon receiving this send small message, may adjust its source threshold 620, typically to a higher value, so that the source flow control layer sends fewer source available messages in the future.

If the sink application has posted or posts sink buffers 606 of sufficient size, the sink flow control layer performs a read zero-copy (Read ZCopy) transfer 608 either until the data is successfully transferred, or until the sink flow control layer changes the mechanism of transfer to BCopy. Specifically, if the Read ZCopy transfer completes 610, the sink flow control layer sends a read complete message (RdCompl Msg) 630 to the source, and the flow control layers wait for the next data transfer 628. During the Read ZCopy transfer, the sink flow control layer may change its behavior and interrupt the Read ZCopy transfer by sending a send small message 612 to signal the source flow control layer to finish sending the data by BCopy transfer 614.

In a first embodiment, there is no way to interrupt the BCopy transfer or to change the mechanism back to a Read ZCopy or other RDMA transfer. In another embodiment, the source flow control layer may be interrupted during a BCopy transfer, and the source application may be able to continue a data transfer by Write ZCopy or the sink flow control layer may be able to continue a data transfer by Read ZCopy. The penalty would be that extra mechanism change messages would be incurred.

In yet another embodiment, if a sink application posts large buffers and communicates this event to the sink flow control layer before the sink flow control layer receives a source available message, the sink flow control layer sends a sink available message to the source. The source flow control layer then may implement a Write ZCopy without sending a source available message. In this manner, the protocol avoids the overhead of an extra or wasted zero-copy message transferred between the flow control layers and the data transfer between applications is faster.

In a preferred embodiment, both flow control layers post and maintain small or BCopy buffers so that BCopy transfers may be performed on demand. In another embodiment, the flow control layers do not post small buffers unless requested to do. For example, the sink flow control layer would post small buffers prior to or just after sending a send small message to the source.

The threshold size for using bulk or zero-copy data transfers is based upon justifying the cost of initiating these types of transfers. Each zero-copy operation has a cost which is a function of the number of control messages exchanged by the transport providers or flow control layers, and a function of the hardware operations needed to support the protocol. In any event, zero-copy operations may be performed on data which is smaller than a threshold. Thus, in an alternative embodiment, the type of transfer or threshold may be overridden and one particular type of transfer may be enforced.

In one embodiment, the source and sink thresholds are independently adjusted based on conditions, transfers, or any set of factors. In another embodiment or implementation, a source threshold is raised to effectively infinity and thus the source or send application may be forced into operating with just one mechanism (e.g. BCopy). In yet another embodiment, source or sink thresholds may be adjusted by an algorithm, local heuristics, or other mechanism. In this manner, through the use of local and remote thresholds, there is no need for explicit mode change operations between source and sink flow control layers as used in the Sockets Direct Protocol (SDP).

Figure 7:
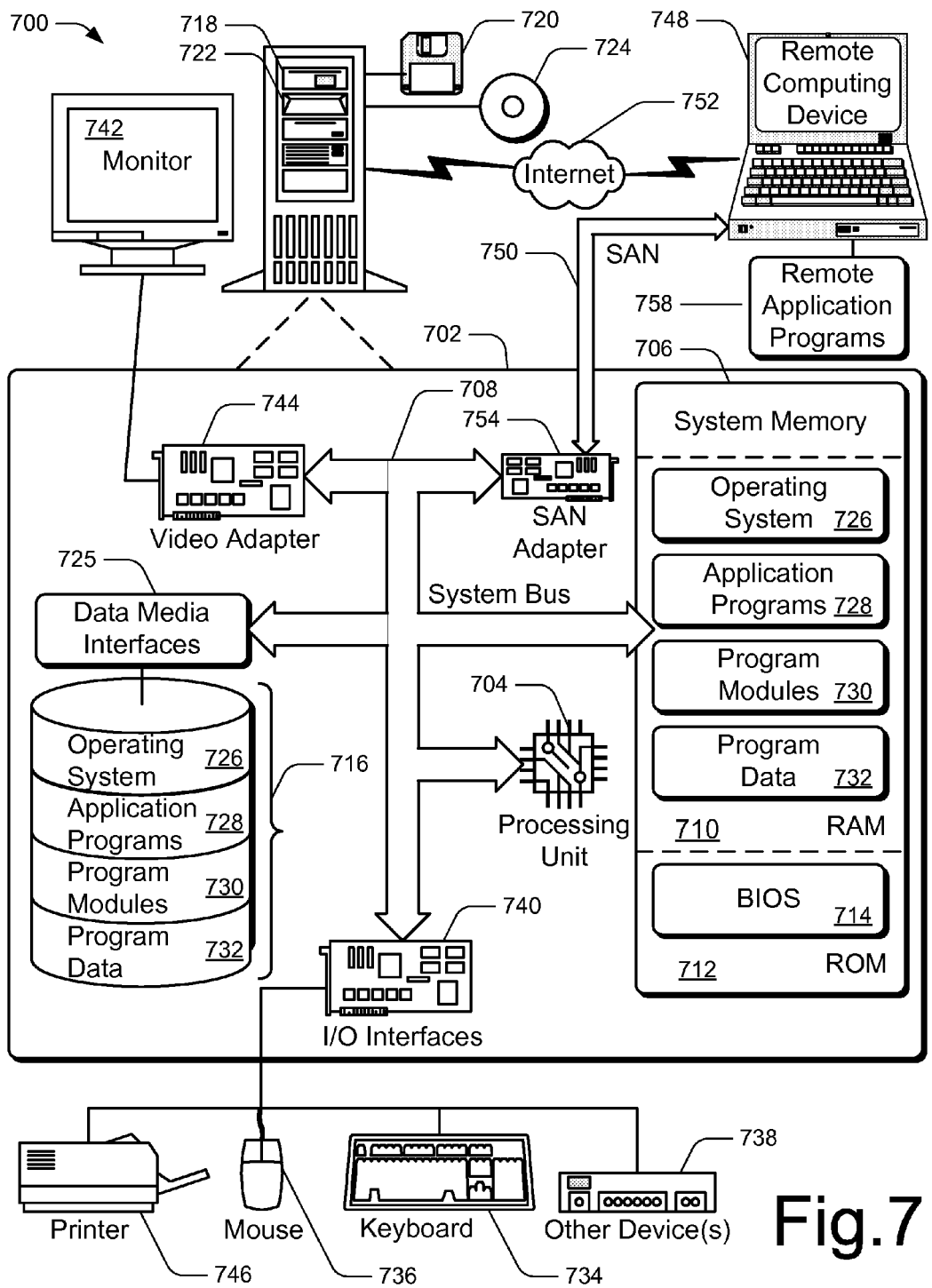
FIG. 7 is a diagram of a representative environment in which the simple flow control protocol may be used.

FIG. 7 is a diagram of a representative environment in which the simple flow control protocol may be used. With reference to FIG. 7, such computer environment 700 comprises a general-purpose computing device in the form of a computer 702. One or more media player applications can be executed by computer 702. The components of a computer 702 may comprise one or more processors or processing units 704 (optionally including a cryptographic processor or co-processor), a system memory 706, and a system bus 708 that couples various system components including the processor 704 to the system memory 706.

The system bus 708 represents one or more of any of several types of bus structures, including a memory bus or memory controller, a point-to-point connection, a switching fabric, a peripheral bus, an accelerated graphics port, and a processor or local bus using any of a variety of bus architectures. By way of example, such architectures comprise an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

An exemplary computer 702 typically comprises a variety of computer readable media. Such media can be any available media that is accessible by computer 702 and comprises both volatile and non-volatile media, removable and non-removable media.

The system memory 706 comprises computer readable media in the form of volatile memory, such as random access memory (RAM) 710, non-volatile memory, such as read only memory (ROM) 712, or both. A basic input/output system (BIOS) 714, containing the basic routines that help to transfer information between elements within a computer 702, such as during start-up, is stored in ROM 712. RAM 710 typically contains data, program modules, or both, that are immediately accessible to or processed by the processing unit 704.

Computer 702 may also comprise other removable/non-removable, volatile/non-volatile computer storage media. By way of example, FIG. 7 illustrates a hard disk drive 716 for reading from and writing to a non-removable, non-volatile magnetic media (not shown), a magnetic disk drive 718 for reading from and writing to a removable, non-volatile magnetic disk 720 (e.g., a "floppy disk"), and an optical disk drive 722 for reading from and/or writing to a removable, non-volatile optical disk 724 such as a CD-ROM, DVD-ROM, or other optical media. The hard disk drive 716, magnetic disk drive 718, and optical disk drive 722 are each connected to the system bus 708 by one or more data media interfaces 725. Alternatively, the hard disk drive 716, magnetic disk drive 718, and optical disk drive 722 can be connected to the system bus 708 by one or more interfaces (not shown).

The disk drives and their associated computer-readable media, or processor-readable media, provide non-volatile storage of computer readable instructions, data structures, program modules, and other data for computer 702. Although the example illustrates a hard disk 716, a removable magnetic disk 720, and a removable optical disk 724, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be used to implement the example computing system and environment.

Any number of program modules can be stored on the hard disk 716, magnetic disk 720, optical disk 724, ROM 712, RAM 710, or combination thereof, including by way of example, an operating system 726, one or more application programs 728, program modules 730, and program data 732. Each of such operating system 726, one or more application programs 728, other program modules 730, and program data 732 (or some combination thereof) may implement all or part of the resident components that support the distributed file system.

A user can enter commands and information into computer 702 via input devices such as a keyboard 734 and a pointing device 736 (e.g., a "mouse"). Other input devices 738 (not shown specifically) may comprise a microphone, joystick, game pad, satellite dish, serial port, scanner, and the like. These and other input devices are connected to the processing unit 704 via input/output interfaces 740 that are coupled to the system bus 708, but may be connected by other interface and bus structures, such as a parallel port, game port, or a universal serial bus (USB).

A monitor 742 or other type of display device can also be connected to the system bus 708 via an interface, such as a video adapter 744. In addition to the monitor 742, other output peripheral devices may comprise components such as speakers (not shown) and a printer 746 which can be connected to the computer 702 via input/output interfaces 740.

A computer 702 on which to practice the protocol described herein operates in a networked environment using logical connections to one or more remote computers, such as a remote computing device 748. By way of example, the remote computing device 748 can be a personal computer, portable computer, a server, a router, a network computer, a peer device or other common network node, game console, and the like. The remote computing device 748 is illustrated as a portable computer that can include many or all of the elements and features described herein relative to computer 702.

Logical connections between a computer 702 and a remote computer 748 are depicted as a local area network (LAN) 750 and a general wide area network (WAN) 752 or Internet. It is to be understood that a computer 702 and remote computer 748 are connected such that the protocol described herein is enabled. In one embodiment, such connection is a switched fabric communications link used in high-performance computing. Such connection is preferably a point-to-point bidirectional serial link.

When implemented in a SAN networking environment, the computer 702 is connected to a local network 750 via a network interface or system area network (SAN) adapter 754 or SAN-enabled NIC. It is to be appreciated that the illustrated network connections are exemplary and that other means of establishing communication link(s) between the computers 702 and 748 can be employed.

In a networked environment, such as that illustrated with computing environment 700, program modules depicted relative to the computer 702, or portions thereof, may be stored in a remote memory storage device. By way of example, remote application programs 758 reside on a memory device of remote computer 748. For purposes of illustration, application programs and other executable program components such as the operating system are illustrated herein as discrete blocks, although it is recognized that such programs and components reside at various times in different storage components of the computing device 702, and are executed by the data processor(s) of the computer.

In the previous description, the embodiments were described with reference to acts and symbolic representations of operations that are performed by one or more computers, unless indicated otherwise. As such, it is understood that such acts and operations, which are at times referred to as being computer-executed, comprise the manipulation by the processing unit of the computer of data in a structured form. This manipulation transforms the data or maintains it at locations in the memory system of the computer, which reconfigures or otherwise alters the operation of the computer in a manner well understood by those skilled in the art. The data structures, where data is maintained, are physical locations of the memory that have particular properties defined by the format of the data. However, the embodiments are not meant to be limiting as those of skill in the art appreciate that various acts and operation described hereinafter may also be implemented in hardware.

Turning to the drawings, wherein like reference numerals refer to like elements, the embodiments are illustrated as being implemented in a suitable computing environment. Although not required, the embodiments will be described in the general context of computer-executable instructions, such as program modules, being executed by a computer. Generally, program modules comprise routines, programs, objects, components, data structures, etc., that perform particular tasks or implement particular abstract data types. Moreover, those skilled in the art appreciate that the embodiments may be practiced with other computer system configurations, including, for example, hand-held devices, multi-processor systems, microprocessor based or programmable consumer electronics, network PCs, minicomputers, mainframe computers, and the like.

Although the description above uses language that is specific to structural features and methodological acts, it is to be understood that the embodiments defined in the appended claims is not limited to the specific elements, features, modes, or acts described. Rather, the specifics are disclosed as exemplary forms.

In view of the many possible embodiments to which the principles described herein may be applied, it should be recognized that the embodiment described herein with respect to the drawing figures is meant to be illustrative only and should not be taken as limiting. For example, those of skill in the art recognize that the elements of the illustrated embodiment shown in software may be implemented in hardware and vice versa or that the illustrated embodiment can be modified in arrangement and detail without departing from the spirit of that described herein. Therefore, the description herein contemplates all such embodiments as may come within the scope of the following claims and equivalents thereof.

I claim:

1. A method to transfer data from a sending application to a receiving application in a computing environment, the method comprising:

determining, by a sender, whether a collective size of one or more sending memory buffers of a sending user application is larger than a source threshold size, the one or more sending memory buffers hold to-be-transferred data;

sending a source-available message, by the sender, to a receiver in response to the determining whether the collective size of the one or more sending memory buffers holding the to-be-transferred data is larger than the source threshold size;

determining whether sufficient receiving memory buffers have been posted by a receiving user application so that the receiving user application may receive all of the to-be-transferred data into the receiving memory buffers;

in response to determining whether sufficient receiving memory buffers have been posted, transferring the to-be-transferred data, by the receiver, via a Remote Direct Memory Access (RDMA) read transfer into the receiving memory buffers and sending a read-complete message, by the receiver, to the sender;

determining whether (1) insufficient receiving memory buffers have been posted by the receiving user application and (2) insufficient receiving memory buffers are posted by the receiving user application in response to the source-available message;

in response to determining whether (1) insufficient receiving memory buffers have been posted by the receiving user application and (2) insufficient receiving memory buffers are posted by the receiving user application in response to the source-available message, sending a send-small message, by the receiver, to the sender and performing a buffer copy of the data by the sender to the receiver, adjusting a sink threshold size after the buffer copy is performed, and adjusting the source threshold size in response to receiving the send-small message, wherein the sender adjusts the source threshold size based on one or more behaviors of a receiving application, independently of the adjustment of the sink threshold size;

determining, by the sender, whether (1) insufficient receiving memory buffers have been posted by the receiving user application and (2) sufficient receiving memory buffers are posted by the receiving user application in response to the source-available message;

transferring the to-be-transferred data via the RDMA read transfer to the receiving memory buffers posted by the receiving user application and sending, by the receiver, the read-complete message, in response to the determining whether (1) insufficient receiving memory buffers have been posted by the receiving user application and (2) sufficient receiving memory buffers are posted by the receiving user application in response to the source-available message;

determining whether the collective size of the one or more sending memory buffers holding the to-be-transferred data is smaller than, or equal to, the source threshold size; and performing a buffer copy of the data, by the sender, to the receiver in response to the determining whether the collective size of the one or more sending memory buffers holding the to-be-transferred data is smaller than, or equal to, the source threshold size.

2. The method of claim 1 wherein the source-available message comprises a portion of the data being transferred.

3. The method of claim 1 wherein the receiver sends a sink-available message before the to-be-transferred data is sent by the sender or received by the receiver.

4. The method of claim 3 wherein the receiver adjusts the sink threshold size further based on one or more behaviors of the sending application.

5. The method of claim 1 wherein the receiver sends a sink-available message after the start of a buffer copy transfer and before the buffer copy transfer is complete.

6. A processor-readable memory having stored thereon instructions that, when executed by one or more processors, causes the one or more processors to perform a method, the method comprising:

transferring data via buffer copy from one or more sending memory buffers posted by a sending application to one or more receiving memory buffers posted by a receiving application, and enabling an adjustment of a receiving threshold size, when a collective size of the one or more sending memory buffers holding the data is smaller than, or equal to, a sending threshold size;

performing the adjustment of the receiving threshold size after the transferring of the data via buffer copy;

sending a source-available message, by a sender, to a receiver, the source-available message comprising a portion of the data when the collective size of the one or more sending memory buffers holding the data is greater than the sending threshold size;

transferring the data via a Remote Direct Memory Access (RDMA) transfer in response to the sender receiving notice that a receiving user application has posted sufficient receive memory buffers so as to be able to receive the data into the posted receive memory buffers;

receiving a send-small message (by the sender), changing the sending threshold size (by the sender) independently of the adjustment of the receiving threshold size and based on one or more behaviors of the receiving application, and transferring the data (by the sender) via buffer copy from the one or more sending memory buffers posted by the sending application to the one or more receiving memory buffers posted by the receiving application, the actions of receiving, changing and transferring being performed in response to the sender receiving notice that the receiving user application has not posted sufficient receive memory buffers or in response to the sender receiving notice that the receiving user application has not posted sufficient receive memory buffers in response to the source-available message, the source-available message indicating that the posted receive memory buffers would be sufficient to accept the data via the RDMA transfer.

7. The processor-readable memory of claim 6 wherein the RDMA transfer comprises performing an RDMA Read transfer, by the receiver, and receiving a read-complete message by the sender.

8. The processor-readable memory of claim 6 wherein the RDMA transfer comprises receiving a sink-available message, by the sender, and performing a RDMA Write transfer, by the sender.

9. The processor-readable memory of claim 6 wherein the transferring of the data via buffer copy is suspended in response to a sink-available message received by the sender and a second portion of the data not yet transferred by buffer copy is transferred via one or more RDMA transfers.

10. A processor-readable memory having stored thereon instructions that, when executed by one or more processors, causes the one or more processors to perform a method, the method comprising:

transferring data via buffer copy from one or more memory buffers posted by a sending application to one or more memory buffers posted by a receiving application when a collective size of the one or more memory buffers holding the data is smaller than, or equal to, a sending threshold size;

receiving a source-available message by a receiver, the source-available message comprising a portion of the data to be transferred when the collective size of the one or more memory buffers holding the data is greater than the sending threshold size;

transferring the data via a Remote Direct Memory Access (RDMA) transfer, the transferring being performed in response to the receiver receiving the source-available message and receiving notice that a receiving user application has posted sufficient receive memory buffers so as to be able to receive the data into the posted receive memory buffers;

sending a send-small message by the receiver to enable an adjustment of the sending threshold size, and receiving data by buffer copy into one or more receive memory buffers posted by the receiving application, wherein a receiving threshold size is modified after receiving the data by the buffer copy, wherein a sender adjusts the sending threshold size independently of the modification of the receiving threshold size and based on one or more behaviors of the receiving application, and wherein these sending and receiving actions are performed when the receiver has given notice, to the sender, that the receiving user application has not posted sufficient receive memory buffers or when the receiver has given notice, to the sender, that the receiving user application has not posted sufficient receive memory buffers in response to the source-available message being received by the receiver for transfer of the data via the RDMA transfer.

11. The processor-readable memory of claim 10 wherein the RDMA transfer comprises performing an RDMA Read transfer, by the receiver, and sending a read-complete message, by the receiver.

12. The processor-readable memory of claim 10 wherein the RDMA transfer comprises sending a sink-available message, by the receiver, and performing a RDMA Write transfer, by the sender.

13. The processor-readable memory of claim 10 wherein the transferring of data by buffer copy is suspended in response to a sink-available message sent by the receiver and a second portion of data not yet transferred via buffer copy is transferred via one or more RDMA transfers.

14. The processor-readable memory of claim 10 wherein the sending application becomes the receiving application and the receiving application becomes the sending application when the data is to be transferred from the receiving user application to a sending user application.

15. The processor-readable memory of claim 10 wherein the method further comprises adjusting the receiving threshold size when the collective size of the one or more memory buffers holding the data is not greater than the sending threshold size.

* * * * *